US012701303B2

(12) United States Patent
Aher et al.

(10) Patent No.: US 12,701,303 B2
(45) Date of Patent: *Aug. 4, 2026

(54) SYSTEMS AND METHODS FOR PROVIDING CONTENT RELEVANT TO A QUOTATION

(71) Applicant: Adeia Guides Inc., San Jose, CA (US)

(72) Inventors: Ankur Aher, Maharashtra (IN); Nikhil Gabhane, Bangalore (IN); Raman Gupta, Bangalore (IN); Aman Puniyani, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,547

(22) Filed: Nov. 21, 2024

(65) Prior Publication Data

US 2025/0159308 A1 May 15, 2025

Related U.S. Application Data

(63) Continuation of application No. 18/211,020, filed on Jun. 16, 2023, now Pat. No. 12,184,949, which is a continuation of application No. 16/528,027, filed on Jul. 31, 2019, now Pat. No. 11,722,749.

(51) Int. Cl.
    *H04N 21/81* (2011.01)
    *H04N 21/422* (2011.01)
    *H04N 21/431* (2011.01)

(52) U.S. Cl.
    CPC ... *H04N 21/8133* (2013.01); *H04N 21/42203* (2013.01); *H04N 21/4314* (2013.01); *H04N 21/4316* (2013.01); *H04N 21/8146* (2013.01)

(58) Field of Classification Search
    CPC ........... H04N 21/8133; H04N 21/8146; H04N 21/4314; H04N 21/4316; H04N 21/42203
    See application file for complete search history.

(56) References Cited

U.S. PATENT DOCUMENTS

| | | |
|---|---|---|
| 11,722,749 B2 | 8/2023 | Aher et al. |
| 12,184,949 B2 | 12/2024 | Aher et al. |
| 2011/0179453 A1 | 7/2011 | Poniatowski |
| 2014/0096162 A1 | 4/2014 | Casey et al. |

(Continued)

FOREIGN PATENT DOCUMENTS

WO       2015/094311 A1      6/2015

*Primary Examiner* — Yassin Alata
(74) *Attorney, Agent, or Firm* — HG LAW LLP

(57) ABSTRACT

Methods and systems are described for providing content, such as a movie, with dialogue including a quotation that was input. For example, using a voice search a viewer may input a quotation famous from a movie to find the original fil and related content. The methods and systems use a quotation engine in a digital device to receive an input including the quotation and access a plurality of content items that include dialogue. The quotation engine identifies a subset of content items that include dialogue similar to the input quotation. The quotation engine accesses metadata of each of the subset of content, ranks the subset based on predetermined criteria and the metadata, and provides the ranked subset of the plurality of content items for consumption. The quotation engine may use a graphical user interface to identify the earliest release, trending content, or the program best known for the quote.

20 Claims, 6 Drawing Sheets

400

(56)  References Cited

U.S. PATENT DOCUMENTS

| | | |
|---|---|---|
| 2014/0324837 A1 | 10/2014 | Byers |
| 2015/0373428 A1 | 12/2015 | Trollope et al. |
| 2016/0171540 A1* | 6/2016 | Mangipudi ........ G06Q 30/0255 |
| | | 705/14.53 |
| 2018/0189391 A1 | 7/2018 | Ip et al. |
| 2019/0325079 A1 | 10/2019 | Blake et al. |
| 2021/0037293 A1 | 2/2021 | Aher et al. |
| 2024/0040210 A1 | 2/2024 | Aher et al. |

* cited by examiner

<u>300</u>

501

516

User Input Interface

Display

514

510

512

508

506

504

502

500

600

SYSTEMS AND METHODS FOR PROVIDING CONTENT RELEVANT TO A QUOTATION

This application is a continuation of U.S. patent application Ser. No. 18/211,020, filed Jun. 16, 2023, which is a continuation of U.S. patent application Ser. No. 16/528,027, filed Jul. 31, 2019, now U.S. Pat. No. 11,722,749, the disclosures of which are hereby incorporated by reference herein in their entireties.

BACKGROUND

The present disclosure relates to systems for providing content based on input of a quotation, and more particularly to systems and related processes for determining relevance of multiple content items including an input quotation.

SUMMARY

Devices are designed to facilitate delivery of content to a user. Content like video, animation, music, audiobooks, ebooks, playlists, podcasts, images, slideshows, games, text, and other media may be consumed by users at any time, as well as nearly in any place. Abilities of devices to provide content to a content consumer are often encouraged with the utilization of advanced hardware with increased memory and fast processors in devices. Devices—e.g., computers, telephones, smartphones, tablets, smartwatches, microphones (e.g., with a virtual assistant), activity trackers, e-readers, voice-controlled devices, servers, televisions, digital content systems, video game consoles, and other internet-enabled appliances—can provide and deliver content almost instantly.

Content might include dialogue, lyrics, writing, and/or other text and words that may be adopted as quotations or quotes used in real-world conversations and situations, as well as quoted in other media. A sentence or phrase from one film or video program may be quoted to identify the film or video program. For example, a quotation may be memorable than a title. Also, a quote may be characteristic of a content item's theme, message, characters, scene, setting, actors, or other parts of a program. Quotations may be found in other content, social media, advertisements, and real-world conversations.

With quotations being valuable tools to identify movies, programs, and content, searching for content by a quotation is popular. While a database of famous movie quotes with 100 quotations and their corresponding films may have been sufficient for viewers, and efficiently managed by only a few people, that is not the case. New problems arrive regarding enormous content collections, multiple forms of media in a search, value in sequels and series, popular quotations in other content, and adoption of quotations in social media (e.g., memes). When a quote permeates popular culture in a society that constantly records and creates content, searching vast amounts of content for that quote and identifying, for example, the recent blockbuster sequel, a fresh TV episode mimicking the quote, a song inspired by the line, or a trending social media parody, as well as the original release, is not an easy task.

The amount of content available to users in any given content delivery system can be substantial. Many users desire a form of content guidance through an interface that allows users to efficiently navigate content selections and easily identify content that they may desire. An application which provides such guidance may be an interactive content guidance application, a content guidance application, or a guidance application.

Interactive content guidance applications may take various forms, such as interactive television program guides or electronic program guides, which may allow users to navigate among and locate many types of content including conventional television programming (provided via broadcast, cable, fiber optics, satellite, internet (IPTV), or other means), as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content.

The guidance provided may be for content available through a television, for content available through one or more devices, or interactive guidance that brings together content available both through a television and through internet-connected devices. The content guidance applications may be provided as online applications (e.g., provided on a website), or as stand-alone applications or clients on hand-held computers, mobile telephones, or other mobile devices. Various devices and platforms that may implement content guidance applications are described in more detail below.

Interactive content guidance applications may utilize input from various sources including remote controls, keyboards, microphones, video and motion capture, touchscreens, and others. For instance, a remote control may use a Bluetooth connection to a television or set-top box to transmit signals to move a cursor. A connected keyboard or other device may transmit input data, via, e.g., infrared or Bluetooth, to a television or set-top box. A remote control may transmit voice data, captured by a microphone, to a television or set-top box. Voice recognition systems and virtual assistants connected with televisions or devices may be used to search for and/or control content to be consumed. As input mechanisms grow more sophisticated and allow faster input, searches based on input must adapt.

Using a keyboard or voice input to search for content in an interactive content guide may allow easier input of more search terms and facilitate searching more than titles of content items, such as searches by other metadata associated with content, such as actors, directors, producers, years, genre, settings, plots, and other data. Metadata may also include full dialogue, portions of a script, closed captions, one or more quotations, best lines, lyrics, text, characters, scene descriptions, notes or other descriptors and data. Metadata may describe or give information about content but can generally be any data associated with a content item.

One approach may search for programs including a well-known quotation. For instance, quotations to search for may be input via keyboard or voice input and a movie or TV show may be matched as including the input quotation. A quotation search may be used as a practical matter where the source is unknown, the quotation does not evoke memory of the movie title, or as entertainment or trivia. For instance, a search for "You talking to me?" may result in the film "Taxi Driver" starring Robert DeNiro. A search for "Nobody puts Baby in a corner" may result in the movie "Dirty Dancing." A search for "I see dead people" may result in the movie "The Sixth Sense." A quotation search might be used as entertainment or trivia, such as when the quotation identifies a title or character. For instance, a search for "Get your stinking paws off me, you damned dirty ape" may result in the movie "Planet of the Apes" from 1968. A search for "E.T. phone home" may result in the movie "E.T. The Extra-Terrestrial."

One approach to identifying quotations in content may be to manually attribute each famous quote to a single movie so that, e.g., when a user searches for the quote with a voice search, the results are a single movie that used the quote. Such an approach requires manual creation of a quotation database and is limited to certain chosen movies. Such an approach will undoubtedly miss famous quotes, as well as "cult classic" quotes only preferred by smaller groups of viewers. Using quotations are an important connection between programs and audiences. With an ever-growing amount of quotable content, there exists a need to automate a quotation database to maximize available quotations to search and minimize dependency on biased human selection.

One approach to identifying quotations in content may be to search text-based dialogue or a script for an input quotation. Such an approach presents several problems relating to multiple results.

One approach to identifying quotations when multiple content items use a quotation may be to merely identify the first or oldest use of the quotation. Such an approach may ignore content for which the quotation is better known. First use may be but one form of criteria to determine the relevance of a quotation. For instance, uses of the quotation in other content such as parodies, sequels, affiliated programs, social media clips and memes, audiobooks and podcasts, and other content may be ignored. There exists a need to determine relevancy of programs to a searched for quotation based on several criteria.

For instance, sometimes, a quotation search may result in multiple movies that utilize the quotation. Sometimes the multiple programs using the same quotation may be a series of movies. For instance, a search for "May the Force be with you" may result in "Star Wars: A New Hope" or the Star Wars series and "Make him an offer he can't refuse" may result in "The Godfather" or the Godfather series. A search for "Hasta la vista, baby" may result in "Terminator 2: Judgment Day" or the Terminator series. A search for "Shaken, not stirred" may result in "Goldfinger" or the James Bond film franchise. There exists a need to identify programs in a film series that were the original sources of the quote and/or helped to popularize a quote.

Sometimes, a quotation search may result in a series of television programs. For instance, a search for "Eat my shorts" may result in a number of episodes of "The Simpsons." A search for "Make it so" may result in many episodes of "Star Trek: The Next Generation." A search for "Danger, Will Robinson" may result in the "Lost in Space" series, despite the line only appearing in one episode. There exists a need to identify programs within a television series that were the original sources of the quote and/or helped to popularize a quote.

Because consumers, writers, and other creators may use part of a quotation, misquote a line, distort a quotation, paraphrase a quotation, or parody a quotation, a quotation search should include, e.g., a quotation, quote, catchphrase, tag line, spoof, parody, citation, or any other allusion. A search for "Do you feel lucky, punk?" may result in "Dirty Harry" even though the actual quote is "You've got to ask yourself one question: 'Do I feel lucky?' Well, do ya punk?" A search for "Toto, I don't think we're in Kansas anymore" may result in "The Wizard of Oz" even though the actual quote is "Toto, I've a feeling we're not in Kansas anymore." A search for "Houston, we have a problem" may result in the film "Apollo 13" despite the quotation between the Apollo 13 aircraft and NASA Mission Control Center being "Houston, we've had a problem." A search for "Lucy, you've got some explaining to do" may result in many episodes of "I Love Lucy" but the line was likely never identical. A search for "Beam me up, Scotty" may result in episodes from "Star Trek: The Original Series" but Captain Kirk actually said, "Beam us up, Mr. Scott." Famous lines from well-known movies and media may be misquoted, but the quotations are no less well known. There exists a need to identify programs that are associated with a popular a quotation even with a misquote of a line.

Quoting a sentence or phrase from one film or video program in another film or video program may be used as an allusion to other films, characters, and themes for writers and audiences. For instance, DeNiro's "You talking to me?" from the film "Taxi Driver" was mimicked in "Back to the Future Part III." Similarly, "Honey, I Shrunk the Kids" borrowed the quote "I don't think we're in Kansas anymore, Toto" in an allusion to "The Wizard of Oz." Quoting another piece may be done in jest, to parody, and for other comedic purposes. For instance, "You've Got Mail" quotes "The Godfather," saying, "Leave the gun, take the cannoli." For instance, many films, including "Cocoon" and "Ernest Saves Christmas" use the quotation "May the Force be with you" from the Star Wars film franchise. There exists a need to identify programs that may not be the source of the quote but are popular programs that may have helped to popularize a quote.

Quotations may come from popular books or writings and become adapted when adopted into new content as allusions to well-known works, characters, and concepts. For instance, a search for the quotation "I love the smell of napalm in the morning" may result in "Apocalypse Now," but has been adapted for use in many films including "Flight" (e.g., "I love the smell of nicotine in the morning"), "Mallrats" (e.g., "I love the smell of commerce in the morning"), "Mr. Popper's Penguins" (e.g., "I love the smell of toner in the morning"), and "Mighty Morphin' Power Rangers: The Movie" (e.g., "I love the smell of destruction in the evening"), as well as several TV shows including Seinfeld (e.g., "I love the smell of cardboard in the morning") and Two and a Half Men (e.g., "love the smell of brimstone in the morning."). The "Apocalypse Now" quotation itself may be a allude to an old saying, e.g., "I love the smell of bacon in the morning." There exists a need to identify programs that are not the source of the quote but are popular programs that helped to popularize a quote through adaptation and parody.

Quoting may occur when a character appears in another program, such as a sequel, prequel, crossover, or other appearance in a, e.g., shared universe. For instance, the quotation "Wakanda forever" appears in "Black Panther" and parts of The Avengers film series of the Marvel Cinematic Universe. For instance, Batman says "I'm Batman" in several films that utilize the character including "The Lego Movie." There exists a need to identify programs that may not be the best-known use of the quote but are related, popular, and may continue to help to popularize a quote.

Quotations may occur, for example, when an actor appears in multiple programs and uses similar phrases that may call back to an earlier performance—whether intended or not. For instance, actor Matthew Mcconaughey often uses the word "alright" in his appearances, which alludes to his seminal performance as "Wooderson" in the 1993 film "Dazed and Confused," where he famously delivered, "Alright, alright, alright." McConaughey can be heard saying "alright" multiple times in other movies, such as "The Lincoln Lawyer" and "Magic Mike." Likewise, Keanu Reeves has uttered "woah" in several films including, "Bill and Ted's Excellent Adventure," "Point Break," "Speed," "The Devil's Advocate," and "The Matrix." Denzel Washington is known to say the words "my man" in, for example, "American Gangster," "The Book of Eli," and "Training Day." There exists a need to identify programs that may have helped to popularize the actor who originally spoke a quotation.

Quotations may also occur, for example, in user-created content. Improvements in technology—e.g., network speeds, storage and memory, availability of capture devices—has enabled smartphones and portable devices to make creating and sharing content via the internet even easier. At least 500 hours of content are uploaded to popular content sharing sites every minute. Searching user content, e.g., on social media and sharing sites, is typically done by title, comments, and sometimes hashtags. One approach of a content sharing site may be to allow searching of a transcript (e.g., dialogue) of a user-created video clip, however, searching for a quotation in such an environment would still result in titles similar to the quote than content including the quote. There exists a need to identify user-created content that may have helped to popularize a quotation.

Quotations that are used in other content and the real world have value in connecting audiences to content. Quotations can be used to identify new content, create playlists, suggest new programs, and keep viewers interested. Identifying quotations in content manually will have shortcomings of missed quotations and missed content as, for instance, there is too much content to sort through. Using automated methods to scan dialogue for quotes can help but will create new problems by presenting viewers with too many options and may bury the most famous uses of the quotations in large amounts of results. Accordingly, there exists a need for identifying content with dialogue including quotations (including misquoted lines, parodies, and adaptations of lines) and calculating a relevance score to identify to content consumers which content uses a quotation in accordance with desired criteria.

Methods and systems are described for providing content, such as a movie, with dialogue including a quotation that was input. For example, using a voice search a viewer may input a quotation famous from a movie to find the original program and/or related content. Embodiments may utilize a quotation engine stored and executed by one or more of the processors and memory depicted in FIGS. 5 and 6, to receive an input including the quotation and access a plurality of content items that include dialogue. The quotation engine identifies a subset of content items that include dialogue similar to the input quotation. The quotation engine accesses metadata of each of the subset of content, ranks the subset based on predetermined criteria and the metadata, and provides the ranked subset of the plurality of content items for consumption. Embodiments of a quotation engine may use a graphical user interface to identify the earliest release, trending content, or the program best known for the quote.

In some embodiments, predetermined criteria may be used to determine a relevance score for a content item. For instance, a relevance score may be calculated based on one or more scores determined from corresponding metadata and normalized based on scores of all content items identified as including the quotation. A quotation engine can be adjusted to provide content item results by weighting different scores based on predetermined criteria. If certain criteria for content containing a quotation is considered more important or valuable in identifying content items with relevance scores that rank higher, criteria and weighting may be adjusted.

In some embodiments, a normalized occurrence score may be used as criteria and weighted in calculating a relevance score. For instance, when a program uses the quotation multiple times in the program, that content item may be more relevant to a search than other content.

In some embodiments, a normalized relatedness score may be weighted as important criteria for calculating a relevance score. For example, when a film or television series uses the quotation, content items belonging to a series may be more relevant to a search than other content. Similarly, when an actor uses the quotation in multiple programs, content items featuring that actor may be more relevant to a search than other content.

In some embodiments, a normalized variation score may be weighted as important criteria for calculating a relevance score. For example, when a content item uses a similar quotation (or the input is a misquote) to one used in many programs, content items with similar variations of the quotation may be more relevant to a search than other content. Conversely, when a content item uses a similar quotation (or the input is a misquote) to one used in many programs, content items with unique variations of the quotation may be more relevant to a search than other content.

In some embodiments, a normalized relatedness score may be weighted as important criteria for calculating a relevance score. For example, when a film or television series uses the quotation, content items belonging to a series may be more relevant to a search than other content.

In some embodiments, a normalized audience score may be weighted as important criteria for calculating a relevance score. For example, when a content item that uses the quotation is more popular, e.g., with higher box office statistics, such content items may be more relevant to a search than other content.

In some embodiments, a normalized social media score may be weighted as important criteria for calculating a relevance score. For example, when a content item is cited in social media, e.g., the title, actors, characters, or quotes from the content appear in social media, such content items may be more relevant to a search than other content. Determining a higher relevancy score for content that may be trending on social media may help audiences identify and consume content that other viewers desire at the same time. Likewise, if user-created content is searched for by quotation, the popularity of content featuring a quotation may be best determined by a normalized social media score.

In some embodiments, a normalized release date score may be weighted as important criteria for calculating a relevance score. For example, while it may just be one factor in several criteria, when a program that used a quotation earlier than another (if not first among many) may be more relevant to a search than other content.

In some embodiments, when some or all normalized scores are weighted and combined to generate a relevance score for each content item using the quotation, the content items may be ranked and presented in an interactive content guidance application. In some embodiments, the content item with the highest relevance score may be depicted as highlighted and/or the ranking of relevance may be demonstrated as depicting thumbnails in ranked order, e.g., from left to right.

In some embodiments, the graphical user interface may include indicators with each representation of a content item that uses the quotation to convey a high ranking in certain criteria. For instance, a content item may have an indicator, e.g., words near a corresponding thumbnail, that the content is trending if that content item has the highest social media score of the set. A content item may have an indicator that the content uses the quotation the most if that content item has the highest occurrence score of the set. In some embodiments, the graphical user interface may include an indicator that a content item is a comedy, is critically acclaimed, or is the earliest use of the quotation, based on corresponding metadata.

In some embodiments, the graphical user interface may include indicators with each representation of a content item that uses the quotation to convey a series, episode, or other relation of a content item to a content series.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
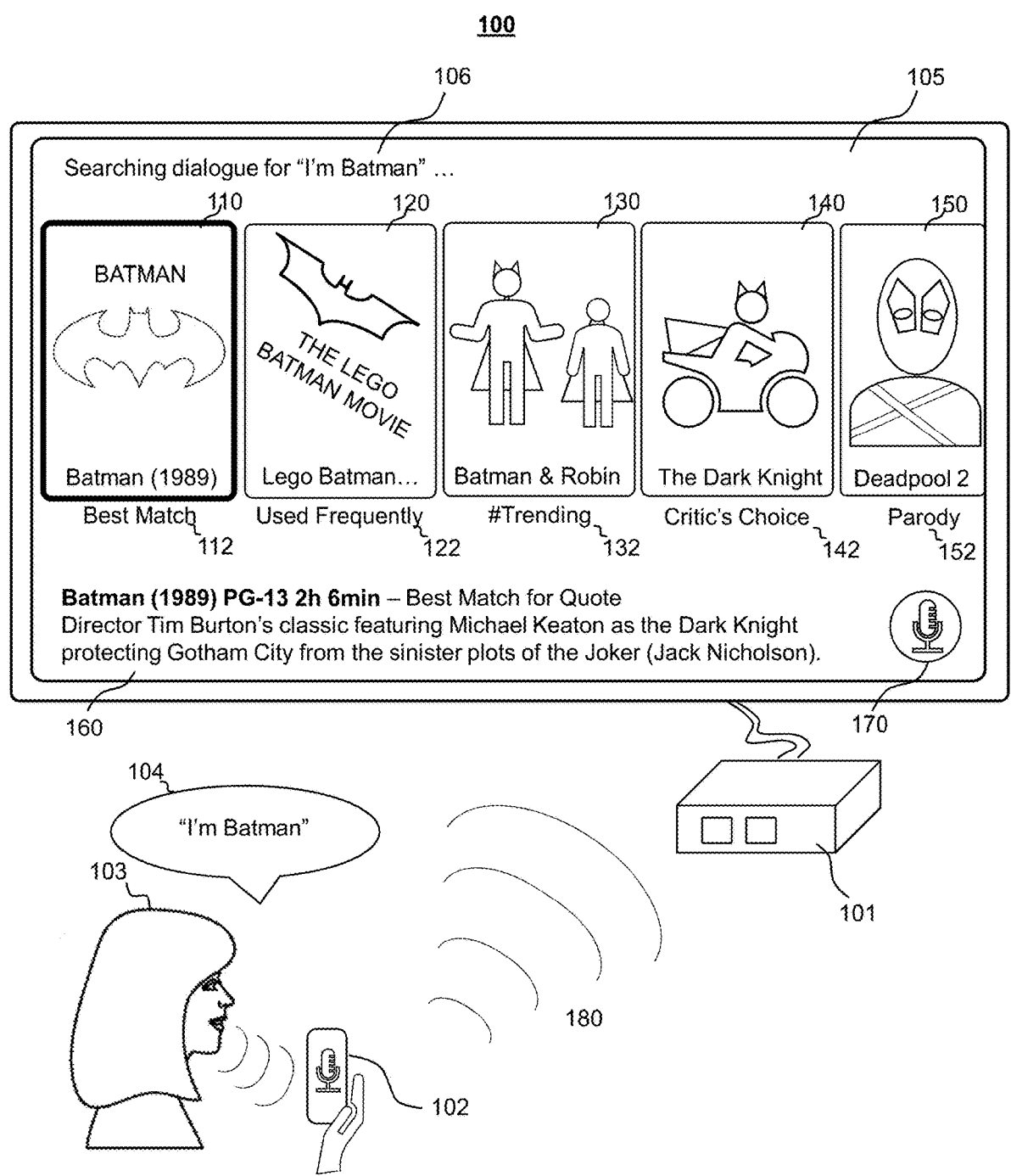
FIG. 1 depicts an illustrative scenario and user interface for providing content with dialogue including an input quotation, in accordance with some embodiments of the disclosure.

FIG. 1 depicts an illustrative scenario and user interface for providing content with dialogue including an input quotation, in accordance with some embodiments of the disclosure.

Figure 5:
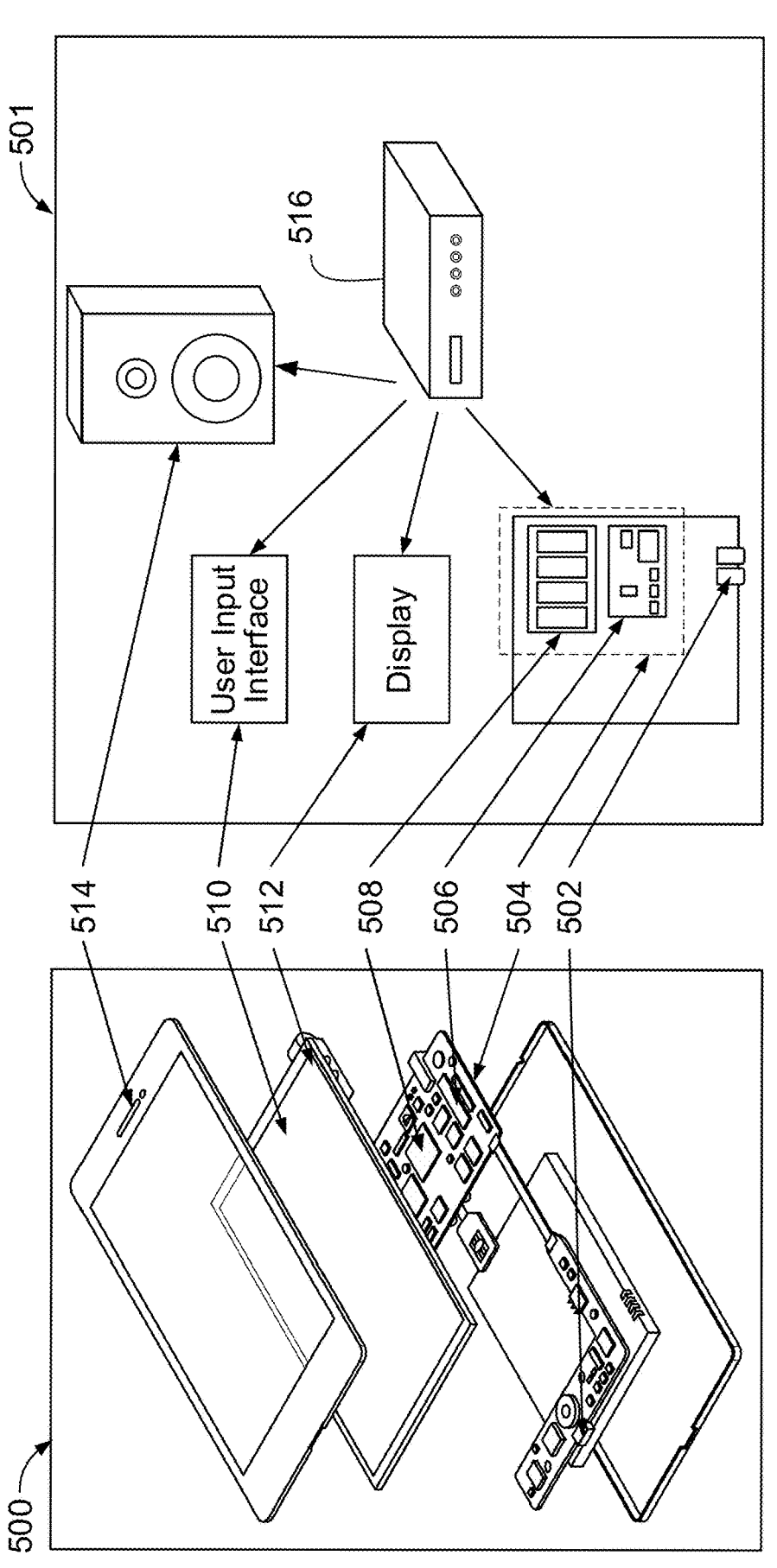
FIG. 5 is a diagram of an illustrative device, in accordance with some embodiments of the disclosure.
Figure 6:
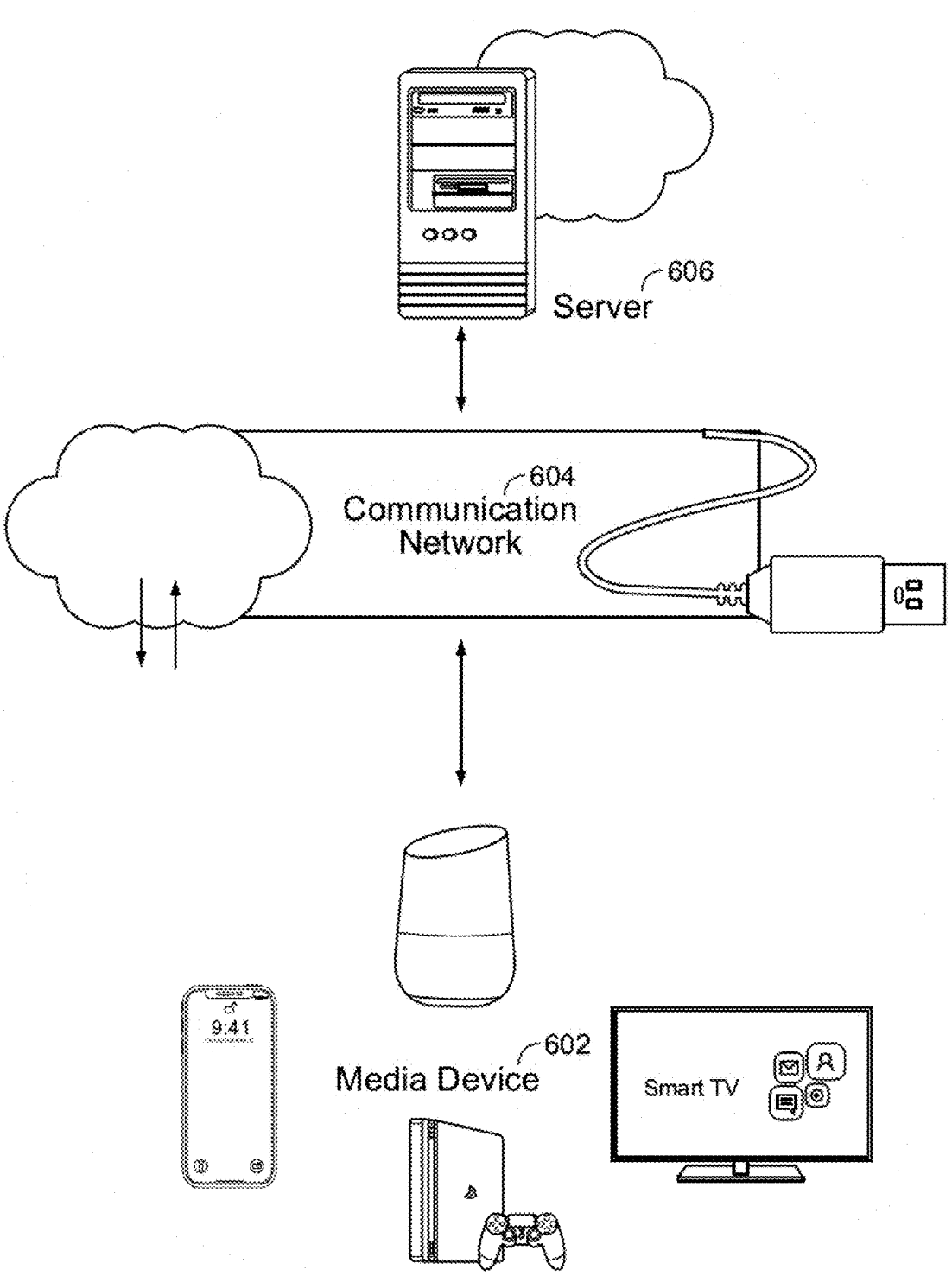
FIG. 6 is a diagram of an illustrative system, in accordance with some embodiments of the disclosure.

An exemplary embodiment is depicted in FIG. 1 as scenario 100 with device 101 generating user interface 105. For example, scenario 100 of FIG. 1 illustrates an embodiment of a quotation search system featuring a graphical user interface, e.g., user interface 105, produced by device 100, depicting movies where the line "I'm Batman" occurs in dialogue. Scenario 100 depicts device 101 in communication, e.g., wirelessly, with remote 102. Device 101 and remote 102 may be separate, e.g., connected via a network, or housed as one device with components functioning together. Device 101 and remote 102 may be any suitable device such as a personal computer, laptop, smartphone, tablet, media center, video console, or any device as depicted in FIGS. 5 and 6, with the combination of devices having capabilities to receive input and provide content for consumption.

Some embodiments may utilize a quotation engine, e.g., as part of an interactive content guidance application, stored and executed by one or more of the processors and memory of device 101 to receive input quotations, identify content using quotations, and calculate relevancy scores of content items based on criteria for the quotation. Some embodiments may include a connection between device 101 and a display, such as a set-top device connected to a television screen via an HDMI cable to display user interface 105.

Scenario 100 depicts device 101 in communication with remote 102. Some embodiments of remote 102 may have a microphone and capabilities to communicate with device 101 via Bluetooth. Remote 102 may be able to receive input, such as voice input, and capable of receiving voice instructions to control device 101.

In scenario 100, remote 102 receives input 104 from user 103. In scenario 100, an input is depicted as voice, however, an input may be, e.g., text. In some embodiments, input 104 includes a phrase or line to search for in a content library. In scenario 100, input 104 includes a quotation: "I'm Batman." In scenario 100, input 104 is received by remote 102 and transmission 180 is transmitted to device 101. In some embodiments, transmission 180 includes input 104, but transmission 180 may include data describing input 104, such as a normalized, altered, or compressed audio, voice-converted-to-text version of the quotation, or other conversions of voice input.

In scenario 100, device 101 accesses a content library to search for a quotation, e.g., "I am Batman" of input 104. User interface 105 depicts voice icon 170 indicating a voice search. User interface 105 depicts a search description 106 to identify device 101 is "Searching dialogue for 'I'm Batman.'" A search for a quotation in a content library may be carried out in many ways as further discussed with regards to FIGS. 3 and 4.

In scenario 100, user interface 105 depicts content items 110, 120, 130, 140, and 150 each with a title and artwork, e.g., a poster or thumbnail. In scenario 100, content item 110 features "Batman (1989)" and criteria 112 indicates it is "Best Match." "The Lego Batman Movie" is depicted as content item 120 and the quotation is indicated to be used frequently by criteria 122. "Batman & Robin" is depicted as content item 130 and criteria 132 indicates that it is trending on social media. "The Dark Knight" is depicted as content item 140 and criteria 142 indicates that it is critically acclaimed. "Deadpool 2" is depicted as content item 150 and criteria 152 indicates that the quote is used as a parody.

User interface 105 depicts content description 160 corresponding to content item 110 as content 110 is depicted as selected. Embodiments may select a content item that best matches by default and content description 160 may be shown by default after a search.

Figure 2:
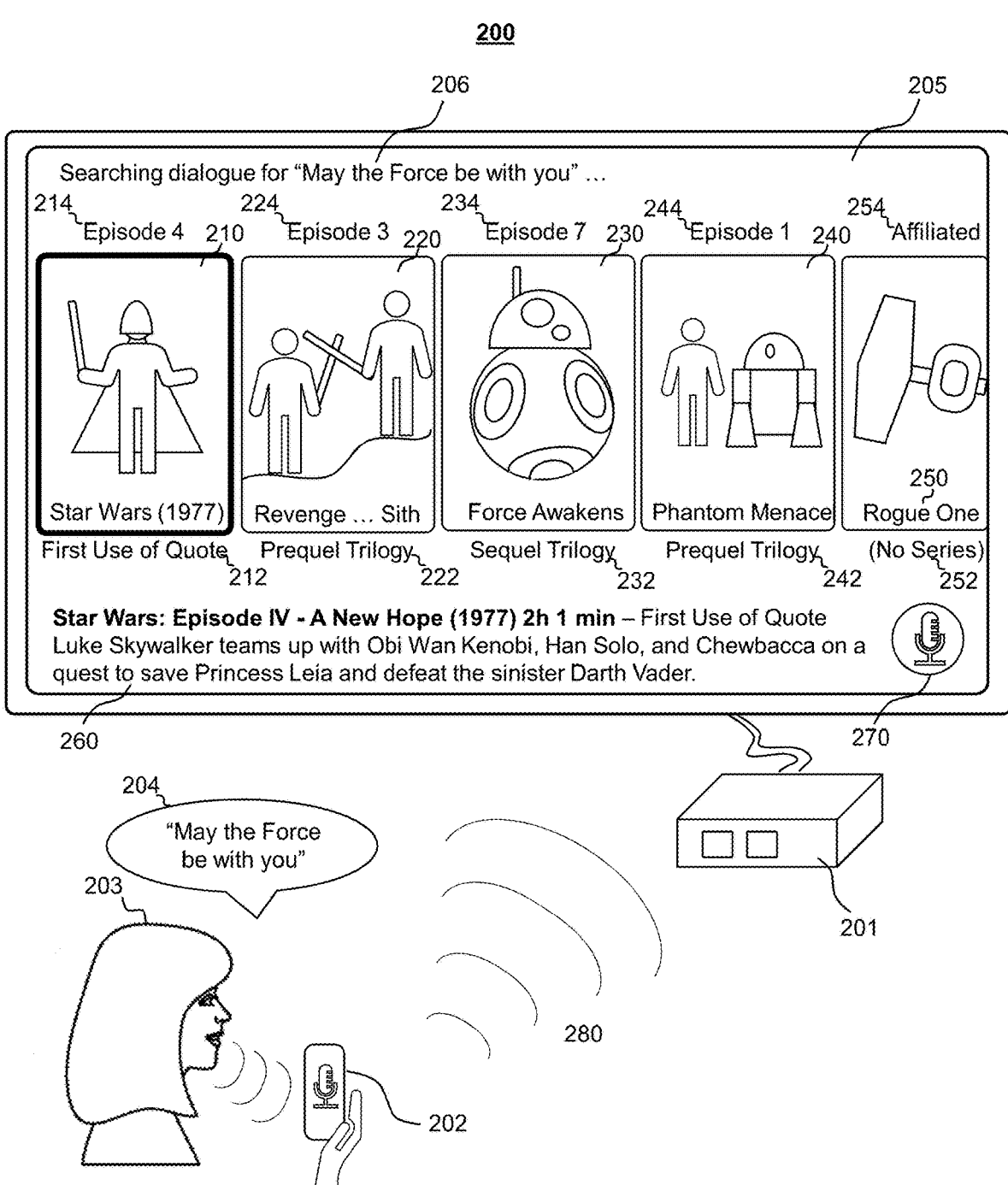
FIG. 2 depicts an illustrative scenario and user interface for providing content with dialogue including an input quotation, in accordance with some embodiments of the disclosure.

FIG. 2 depicts an illustrative scenario and user interface for providing content with dialogue including an input quotation, in accordance with some embodiments of the disclosure.

An exemplary embodiment is depicted in FIG. 2 as scenario 200 with device 201 generating user interface 205. For example, scenario 200 of FIG. 2 illustrates an embodiment of a quotation search system featuring a graphical user interface, e.g., user interface 205, produced by device 200, depicting movies where the line "May the Force be with you" occurs in dialogue. Scenario 200 depicts device 201 in communication, e.g., wirelessly, with remote 202. Device 201 and remote 202 may be separate, e.g., connected via a network, or housed as one device with components functioning together. Device 201 and remote 202 may be any suitable device as depicted in FIGS. 5 and 6.

Some embodiments may utilize a quotation engine, e.g., as part of an interactive content guidance application, stored and executed by one or more of the processors and memory of device 201 to receive input quotations, identify content using quotations, identify related content items within a series or shared universe, and calculate relevancy scores of content items based on criteria for the quotation.

Scenario 200 depicts device 201 in communication with remote 202. Some embodiments of remote 202 may have a microphone and remote 202 may be able to receive input, such as voice input, and capable of receiving voice instructions to control device 201.

In scenario 200, remote 202 receives input 204 from user 203. In scenario 200, an input is depicted as voice, however, an input may be, e.g., text. In some embodiments, input 204 includes a phrase or line to search for in a content library. In scenario 200, input 204 includes a quotation: "May the Force be with you." In scenario 200, input 204 is received by remote 202 and transmission 280 is transmitted to device 201.

In scenario 200, device 201 accesses a content library to search for a quotation, e.g., "May the Force be with you" of input 204. User interface 205 depicts voice icon 270 indicating a voice search. User interface 205 depicts a search description 206 to identify device 201 is "Searching dialogue for 'May the Force be with you.'" A search for a quotation in a content library may be carried out in many ways as further discussed with regards to FIGS. 3 and 4.

In scenario 200, user interface 205 depicts content items 210, 220, 230, 240, and 250, each with a title and artwork, e.g., a related scene image, poster, or thumbnail. In scenario 200, content item 210 features "Star Wars (1977)," referring to "Star Wars: A New Hope," with series indicator 214 identifying "Episode 4," and criteria 212 indicates it is the first use of the quotation, referring to "Star Wars: Revenge of the Sith" is depicted as content item 220 with a shortened title "revenge . . . Sith," series indicator 224 identifying "Episode 3," and indication as part of a prequel trilogy by criteria 222. "Star Wars: The Force Awakens" is depicted as content item 230 with a shortened title "Force Awakens," series indicator 234 identifying "Episode 7," and criteria 232 indicating that content item 230 is part of a sequel trilogy. "Star Wars: The Phantom Menace" is depicted as content item 240, with series indicator 214 identifying "Episode 1," and criteria 242 indicating that content item 240 is part of a prequel trilogy. "Rogue One: A Star Wars Story" is depicted as content item 250 with a shortened titled of "Rogue One," with series indicator 214 identifying that content item 250 is "Affiliated," and criteria 252 indicating that content item 250 does not belong to a particular series.

User interface 205 depicts content description 260 corresponding to content item 210 as content 210 is depicted as selected.

Figure 3:
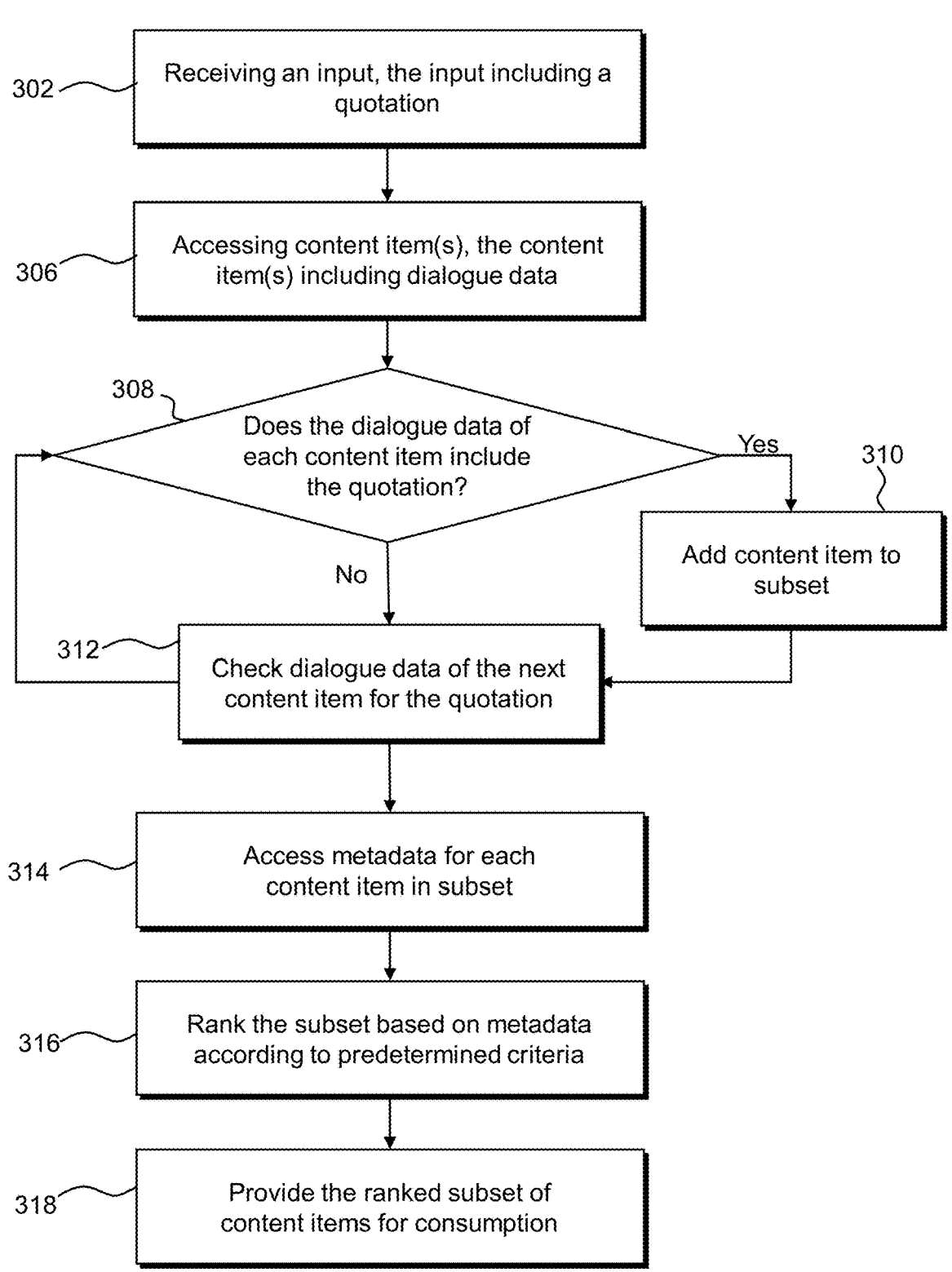
FIG. 3 depicts an illustrative flowchart of a process for providing content with dialogue including an input quotation, in accordance with some embodiments of the disclosure.

FIG. 3 depicts an illustrative flowchart of a process for providing content with dialogue including an input quotation, in accordance with some embodiments of the disclosure. Some embodiments may include, for instance, a quotation engine, e.g., as part of an interactive content guidance application, carrying out the steps of process 300 depicted in the flowchart of FIG. 3. In some embodiments the results of process 300 may be recorded in a quotation database. In some embodiments, process 300 may be performed when needed (e.g., a search), performed or updated periodically, and/or performed when new content items become accessible.

At step 302, a quotation engine receives input with the start cue for an activity, the input including a quotation.

Input may come from a user, e.g., a user wishing to find content items that use a quotation, however, process 300 may occur prior to and in preparation for a user's search. For instance, input may be automated or semi-automated and fed from popular quotations in content, social media, websites or other sources into process 300 in order to identify relevant content items. In some embodiments, results of process 300 may be stored in a quotation database in case one or more users provide a similar quotation to search. In some embodiments, if process 300 occurs prior to a user search and content items have been added, results of process 300 may need to be updated, e.g., by undertaking some or all steps of process 300. Embodiments may include metadata that is dynamic and/or depends on audience and social media data, which may require periodic updating of a quotation database via performing some or all steps of process 300.

At step 306, after receiving input with a quotation at step 302, the quotation engine accesses content items, the content items including dialogue data. Dialogue data may include full dialogue, portions of a script, closed captions, one or more quotations, best lines, lyrics, text, characters, scene descriptions, notes or other metadata. At step 306, the quotation engine determines if dialogue data of each content item includes the quotation. In some embodiments, determining if the quotation occurs in dialogue of a content item may include converting the dialogue data to text, converting the quotation to text, and searching for the quotation with the dialogue. In some embodiments, determining if the quotation occurs in dialogue of a content item may include audio analysis that compares a voice input of the quotation to a soundtrack of a content item and analyzes for similarities. In some embodiments, determining if the quotation occurs in dialogue of a content item may include accessing metadata or external sites that includes top quotations of the movie, audio analysis that compares a voice input of the quotation to a soundtrack of a content item and analyzes for similarities. In some embodiments, the quotation engine identifies each use of a quotation in dialogue data and records the number of occurrences and a timestamp of each use.

If dialogue data of the content item includes the quotation, the content item is added to a subset at step 310. Then, after a content item is added to a subset or the content item is determined to not include the quotation, then, in step 312, dialogue data of a next content item is checked for the quotation. In some embodiments, as the quotation engine identifies a subset of content items that include the quotation, then relevancy of each content item (and use of the quotation) can be determined. For instance, a relevancy determination may occur for each identified content item after it is identified or after all the subset is identified and, in some embodiments, may be recorded in a quotation database.

At step 314, the quotation engine accesses metadata for each content item of the subset. Metadata may describe or give information about content but can generally be any data associated with a content item. In some embodiments, metadata may be used to rank content items based on predetermined criteria. For instance, metadata may include a release year which may determine which content items had earliest uses of the quote. In some embodiments, metadata may include box office sales which may determine which content items are/were the most popular to use the quote. In some embodiments, metadata may include a count of quotation occurrences which may determine which content items use the quote most often and are most well-known for the quotation. In some embodiments, metadata may include reviews and/or accolades, which may reflect popularity. In some embodiments, metadata may include actors who use the quotation, which may reflect popularity. In some embodiments, metadata may include social media statistics for the content items and/or quotation, which may reflect popularity. At step 316, the quotation engine ranks the content items of the subset based on corresponding metadata according to predetermined criteria.

At step 318, the quotation engine provides the ranked subset of content items for consumption. In some embodiments, the quotation engine may provide the ranked subset of content items in a graphical user interface, e.g., as part of an interactive content guidance application. For example, FIGS. 1 and 2 depict user interfaces including results for searching dialogue for an input quotation.

Figure 4:
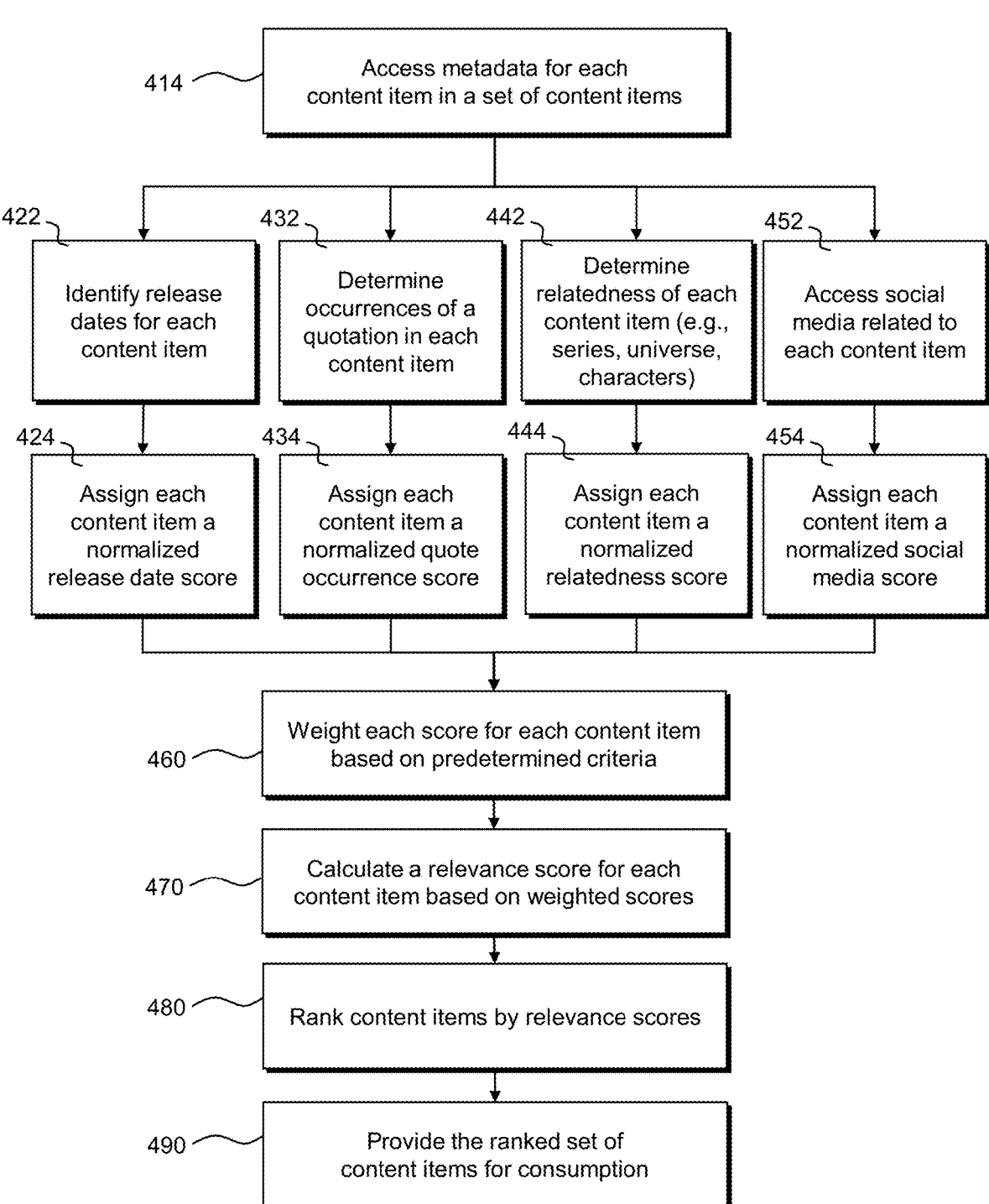
FIG. 4 depicts an illustrative flowchart of a process for calculating relevance scores for content with dialogue including an input quotation, in accordance with some embodiments of the disclosure.

FIG. 4 depicts an illustrative flowchart of a process for calculating relevance scores for content with dialogue including an input quotation, in accordance with some embodiments of the disclosure. In some embodiments, content may be scored and ranked based on metadata according to predetermined criteria. Some embodiments may include, for instance, a quotation engine, e.g., as part of an interactive content guidance application, carrying out the steps of process 400 depicted in the flowchart of FIG. 4. In some embodiments the results of process 400 may be recorded in a quotation database. In some embodiments, certain or all steps of process 400 may be performed when needed (e.g., a search), performed or updated periodically, and/or performed when new content items become accessible.

In some embodiments, certain steps of process 400 may be performed as part of or in conjunction with process 300. For instance, process 400 may supplement or replace steps 314, 316, and 318 of process 300.

Exemplary process 400 includes exemplary metadata and criteria. In some embodiments, certain steps of process 400 may be omitted if, for instance, necessary metadata is not available for a given content item. In some embodiments, additional steps may be added to process 400 if, for instance, other metadata is available and/or other criteria is valuable.

At step 414, the quotation engine accesses metadata for each content item a set of content items. In some embodiments, a set of content items may be the identified subset of content items identified in steps 302, 306, 308, 310, and 312 of process 300. For instance, the set of content items may each have dialogue that includes a quotation. Metadata may describe or give information about content but can generally be any data associated with a content item. In process 400, steps 422, 432, 442, and 452 may occur in any order or simultaneously for each content item. Likewise, steps 424, 434, 444, and 454 may occur in any order or simultaneously for each content item, however, steps that normalize a score generally depend on having a score for each content item in the set.

At step 422, the quotation engine identifies release dates for each content item. In some embodiments, the earliest release date for a content item may reflect an original use of a quotation. At step 424, the quotation engine assigns each content item a normalized release date score based on earliest release date. For instance, a content item with the earliest release date may receive a score of 1 and all other content items may be scored 0. In some embodiments, a content item with the earliest release date may receive a score of 1 and all other content items may be scored on a normalized scale based on different in time/years.

At step 432, the quotation engine determines occurrences of a quotation in each content item. At step 434, the quotation engine assigns each content item a normalized quote occurrence score. For instance, in some embodiments, if each content item in a set uses the quotation only once, then each content item may be assigned a quote occurrence score of 1. In some embodiments, if each content item uses the quotation a different amount of times, then each content item may be assigned a quote occurrence score from 0 to 1 based on proportionality to the maximum occurrences.

At step 442, the quotation engine determined relatedness (e.g., series, universe, characters, actors, writers, etc.) At step 444, the quotation engine assigns each content item a normalized relatedness score. In some embodiments, each content item that is part of a series may be assigned a relevance score of 1 and each content item content item that is part of a series may be assigned a relevance score of 0. In some embodiments, each content item that is part of the same series may be assigned a relatedness score of 1. In some embodiments, if each content item is part of one of a plurality of series, each content item may still be assigned a relatedness score of 1. In some embodiments, if each content item is part of one of a plurality of series, each content item may be assigned a relatedness score based on the size of the series and then normalized from 0 to 1. For instance, if a quotation appears in a trilogy and a separate quadrilogy (e.g., series of four), then each content item of the quadrilogy may be assigned a relatedness score of 1 and each content item of the trilogy may be assigned a relatedness score of 0.75. In some embodiments, each content item that is part of a series where multiple parts of the series use the quotation may be assigned a relevance score of 1 and each content item that is part of a series where only one of the parts of the series uses the quotation may be assigned a relevance score of 0. For instance, with the quotation "I'm Batman" depicted in FIG. 1, each of content item 110, 120, 130, and 140 are parts of series, but content item 150, "Deadpool 2," belongs to a series that does not use the quotation again. While "Deadpool 2" uses the quotation in parody, a relatedness score may be used to lower an overall relevance score of a content item that is piggybacking with a popular series by using the quotation. For instance, the movie "Ernest Saves Christmas" uses the quotation "May the Force be with you," but would not have as high a score as the Star Wars films despite being considered part of a (much different) series of movies.

In some embodiments, each content item is not part of a series together but is part of a shared universe or shares characters, may be assigned a score greater than zero but perhaps less than a normalized score for each content item of the series. For instance, a quotation such as "Wakanda Forever" may appear in several films from the Marvel Cinematic Universe, including The Avengers series, but "Black Panther" is not (yet) a series and a relatedness score may reflect that the film is related to other films, and shares characters and settings, but not (yet) in a dedicated Black Panther series. "Black Panther" may be the original and most popular use of the quotation, but some audiences may associate the quotation with other content and a relevance score may take that into consideration, especially with a popular film franchise that encompasses smaller series. If "Black Panther" gets a sequel, and the sequel uses the phrase "Wakanda Forever," then relatedness scores may be updated and re-normalized, with "Black Panther" and the expected "Black Panther 2" receiving higher relatedness scores to reflect any fame benefits from the quotation being found in a series (as well as a few films in the Marvel Cinematic Universe).

At step 452, the quotation engine accesses social media data related to each content item. At step 454, the quotation engine assigns each content item a normalized social media score. In some embodiments social media data may include statistics on frequency and recency of mentions of a content item and/or the quotation at issue. In some embodiments, the quotation engine may assign a content item a social media score from 1 to 0 based proportionally on the most recent mention of the content item, e.g., title, character, actors, images, clips, etc. In some embodiments, the quotation engine may assign a content item a social media score from 1 to 0 based proportionally on the most recent mention by a specific user, celebrity, social media influencer, or news source. In some embodiments, the quotation engine may assign a content item a social media score from 1 to 0 based proportionally on an average calculation of number of mentions and respective timestamps for each content item.

At step 460, the quotation engine weights each score for each content item based on predetermined criteria and, in step 470, the quotation engine calculates a relevance score for each content item based on weighted scores. In some embodiments, the quotation engine calculates a relevance score by weighting each of a normalized release date score, a normalized occurrence score, a normalized relatedness score, and a normalized social media score according to predetermined criteria. For instance, if the original quotation source is most important for a search then a normalized release date score may be weighted very heavily. For instance, if trending use of a quotation or content is most important for a search then the normalized social media score may be weighted heavily. For instance, if related content that uses a quotation or is most important for a search then the normalized relatedness score may be weighted heavily. At step 480, the quotation engine ranks content items based on calculated relevance score.

At step 490, the quotation engine provides the ranked subset of content items for consumption. In some embodiments, the quotation engine may provide the ranked subset of content items in a graphical user interface, e.g., as part of an interactive content guidance application. For example, FIGS. 1 and 2 depict user interfaces including results for searching dialogue for an input quotation. In some embodiments, an interface may indicate content items with the highest values of, e.g., normalized release date score, a normalized occurrence score, a normalized relatedness score, and a normalized social media score according to predetermined criteria.

FIG. 5 shows a generalized embodiment of illustrative device 500. As referred to herein, device 500 should be understood to mean any device that can receive input and other features from one or more of their devices, one or more network-connected devices, one or more electronic devices having a display, or provide content for consumption. As depicted in FIG. 5, device 500 is a smartphone, however, device 500 is not limited to smartphones or and may be any computing device. For example, device 500 of FIG. 5 can be in system 600 of FIG. 6 as device 602, including but not limited to a smartphone, a smart television, a tablet, a microphone (e.g., with voice control or a virtual assistant), a computer, or any combination thereof, for example.

Device 500 may be implemented by a device or system, e.g., a device providing a display to a user, or any other suitable control circuitry configured to generate a display to a user of content. For example, device 500 of FIG. 5 can be implemented as equipment 501. In some embodiments, equipment 501 may include set-top box 516 that includes, or is communicatively coupled to, display 512, audio equipment 514, and user input interface 510. In some embodiments, display 512 may include a television display or a computer display. In some embodiments, user interface input 510 is a remote-control device. Set-top box 516 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 500 and equipment 501 may receive content and receive data via input/output (hereinafter "I/O") path 502. I/O path 502 may provide content and receive data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communication paths (described below). I/O functions may be provided by one or more of these communication paths but are shown as a single path in FIG. 5 to avoid overcomplicating the drawing. While set-top box 516 is shown in FIG. 5 for illustration, any suitable computing device having processing circuitry, control circuitry, and storage may be used in accordance with the present disclosure. For example, set-top box 516 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application quotation engine stored in memory (e.g., storage 508). Specifically, control circuitry 504 may be instructed by the application to perform the functions discussed above and below. For example, the application may provide instructions to control circuitry 504 to generate the content guidance displays. In some implementations, any action performed by control circuitry 504 may be based on instructions received from the application.

In some client-server-based embodiments, control circuitry 504 includes communications circuitry suitable for communicating with an application server. A quotation engine may be a stand-alone application implemented on a device or a server. A quotation engine may be implemented as software or a set of executable instructions. The instructions for performing any of the embodiments discussed herein of the quotation engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5, the instructions may be stored in storage 508, and executed by control circuitry 504 of a device 500.

In some embodiments, a quotation engine may be a client-server application where only the client application resides on device 500 (e.g., device 602), and a server application resides on an external server (e.g., server 606). For example, a quotation engine may be implemented partially as a client application on control circuitry 504 of device 500 and partially on server 606 as a server application running on control circuitry. Server 606 may be a part of a local area network with device 602 or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 606), referred to as "the cloud." Device 500 may be a cloud client that relies on the cloud computing capabilities from server 606 to determine times, identify one or more content items, and provide content items by the quotation engine. When executed by control circuitry of server 606, the quotation engine may instruct the control circuitry to generate the quotation engine output (e.g., content items and/or indicators) and transmit the generated output to device 602. The client application may instruct control circuitry of the receiving device 602 to generate the quotation engine output. Alternatively, device 602 may perform all computations locally via control circuitry 504 without relying on server 606.

Control circuitry 504 may include communications circuitry suitable for communicating with a quotation engine server, a quotation database server, or other networks or servers. The instructions for carrying out the above-mentioned functionality may be stored and executed on the application server 606. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 508 may be used to store various types of content described herein as well as content guidance data described above. Nonvolatile memory may also be used (e.g., to launch a boot-up routine and other instructions). Cloud-based storage, for example, (e.g., on server 606) may be used to supplement storage 508 or instead of storage 508.

A user may send instructions to control circuitry 504 using user input interface 510. User input interface 510, display 512 may be any suitable user interface touch-screen, touchpad, stylus and may be responsive to external device add-ons such as a remote control, mouse, trackball, keypad, keyboard, joystick, voice recognition interface, or other user input interfaces. Display 510 may include a touchscreen configured to provide a display and receive haptic input. For example, the touchscreen may be configured to receive haptic input from a finger, a stylus, or both. In some embodiments, equipment device 500 may include a front-facing screen and a rear-facing screen, multiple front screens, or multiple angled screens. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 516.

Audio equipment 510 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of each one of device 500 and equipment 501 or may be stand-alone units. An audio component of videos and other content displayed on display 512 may be played through speakers of audio equipment 514. In some embodiments, audio may be distributed to a receiver (not shown), which processes and outputs the audio via speakers of audio equipment 514. In some embodiments, for example, control circuitry 504 is configured to provide audio cues to a user, or other audio feedback to a user, using speakers of audio equipment 514. Audio equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504.

An application (e.g., for generating a display) may be implemented using any suitable architecture. For example, a stand-alone application may be wholly implemented on each one of device 500 and equipment 501. In some such embodiments, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may monitor the words the user inputs in his/her messages for keywords and topics. In some embodiments, control circuitry 504 monitors user inputs such as texts, calls, conversation audio, social media posts, etc., to detect keywords and topics. Control circuitry 504 may store the detected input terms in a keyword-topic database and the keyword-topic database may be linked to the user profile. Additionally, control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the application is a client-server-based application. Data for use by a thick or thin client implemented on each one of device 500 and equipment 501 is retrieved on-demand by issuing requests to a server remote from each one of device 500 and equipment 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

As depicted in FIG. 6, device 602 may be coupled to communication network 604. Communication network 604 may be one or more networks including the internet, a mobile phone network, mobile voice or data network (e.g., a 4G or LTE network), cable network, public switched telephone network, Bluetooth, or other types of communication network or combinations of communication networks. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

In some embodiments, the application is downloaded and interpreted or otherwise run by an interpreter or virtual machine (e.g., run by control circuitry 504). In some embodiments, the application may be encoded in the ETV Binary Interchange Format (EBIF), received by control circuitry 504 as part of a suitable feed, and interpreted by a user agent running on control circuitry 504. For example, the application may be an EBIF application. In some embodiments, the application may be defined by a series of JAVA-based files that are received and run by a local virtual machine or other suitable middleware executed by control circuitry 504.

In some embodiments, a system may include a user interface, with processing occurring remotely (e.g., at a network entity). In some embodiments, an application for displaying storyline information may be implemented on one or more devices that do not include user devices. In some embodiments, control circuitry is configured to access content, identify storylines, and generate for display an informational presentation arranged in suitable way. To illustrate, in some embodiments, law enforcement officers may view a screen of a virtual reality (VR) capable device that has access (e.g., network connectivity, or other communicative access) to a city video surveillance database. Using the VR device (e.g., a headset, personal device, smartphone connected to a wearable display), a police officer may browse and filter the video feeds recorded from a series of cameras around the city, by type of action recorded (e.g., via metadata tags), people identified in the sequences (e.g., via metadata tags), vehicles or license plates thereof shown in the video segments, any other attribute of the video segments, or any combination thereof. Accordingly, rather than a plot arc and characters, the storyline may include action type, persons, articles of clothing, vehicles, items (e.g., stolen property), or other identifiable attributes of video segments. Further, in some embodiments, rather than segments describing portions of episodes of a program, segments may refer to recordings or video clips (e.g., divided into segments in any suitable partition). Further, in some embodiments, rather than program title, the system may present information corresponding to a set of cameras or other video sources.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving an input, the input including a quotation;

accessing a plurality of content items, wherein each content item includes metadata;

based on analyzing the metadata of each content item, identifying a subset of the plurality of content items whose metadata each indicate:

dialogue substantially similar to the quotation; and at least one or more predetermined criteria, the one or more predetermined criteria comprising: first use, frequency of use in dialogue, trending use, sequel use, use within a series, use within a shared universe, and parody use;

for each content item in the subset of the plurality of content items, assigning a weighted relevance score to the content item based on the one or more predetermined criteria associated with the respective content item; and causing to be provided for simultaneous display a list of the subset of the plurality of content items, ordered based on the respective weighted relevance scores of each content item in the subset of the plurality of content items.

2. The method of claim 1, wherein the quotation is at least one of a:

direct quotation, misquotation, or paraphrased quotation of dialogue associated with the subset of the plurality of content items.

3. The method of claim 1, wherein the weighted relevance score for each content item is based at least in part on a relative value of the one or more predetermined criteria for identifying content items relevant to the quotation.

4. The method of claim 1, further comprising:

accessing a user profile comprising user preferences; and modifying the weighted relevance score of each content item of the subset of the plurality of content items based at least in part on a user preference associated with each predetermined criterion.

5. The method of claim 1, wherein the metadata for each content item includes a release date, the method further comprising:

increasing the weighted relevance score of the content item with an earliest release date.

6. The method of claim 1, wherein the list of the subset of the plurality of content items is ordered from the content item with a highest weighted relevance score to the content item with a lowest weighted relevance score.

7. The method of claim 1, wherein causing to be provided for simultaneous display the list of the subset of the plurality of content items further comprises:

generating for display an indicator adjacent to each content item in the list, wherein the indicator identifies which of the one or more predetermined criteria is met by the respective content item.

8. The method of claim 1, wherein in response to receiving a selection of a content item from the list of the subset of the plurality of content items:

automatically providing the selected content item for consumption.

9. The method of claim 1, wherein the predetermined trending use criteria is based at least in part on social media data.

10. The method of claim 1, wherein the input is a voice input.

11. A system comprising:

input/output circuitry configured to receive an input, the input including a quotation;

control circuitry configured to;

access a plurality of content items, wherein each content item includes metadata;

based on analyzing the metadata of each content item, identify a subset of the plurality of content items whose metadata each indicate:

dialogue substantially similar to the quotation; and at least one or more predetermined criteria, the one or more predetermined criteria comprising: first use, frequency of use in dialogue, trending use, sequel use, use within a series, use within a shared universe, and parody use;

for each content item in the subset of the plurality of content items, assign a weighted relevance score to the content item based on the one or more predetermined criteria associated with the respective content item;

cause to be provided for simultaneous display a list of the subset of the plurality of content items, ordered based on the respective weighted relevance scores of each content item in the subset of the plurality of content items.

12. The system of claim 11, wherein the quotation is at least one of a:

direct quotation, misquotation, or paraphrased quotation of dialogue associated with the subset of the plurality of content items.

13. The system of claim 11, wherein the weighted relevance score for each content item is based at least in part on a relative value of the one or more predetermined criteria for identifying content items relevant to the quotation.

14. The system of claim 11, wherein the control circuitry is further configured to:

access a user profile comprising user preferences; and modify the weighted relevance score of each content item of the subset of the plurality of content items based at least in part on a user preference associated with each predetermined criterion.

15. The system of claim 11, wherein the metadata for each content item includes a release date, and wherein the control circuitry is further configured to:

increase the weighted relevance score of the content item with an earliest release date.

16. The system of claim 11, wherein the list of the subset of the plurality of content items is ordered from the content item with a highest weighted relevance score to the content item with a lowest weighted relevance score.

17. The system of claim 11, wherein the control circuitry configured to cause to be provided for simultaneous display the list of the subset of the plurality of content items is further configured to:

generate for display an indicator adjacent to each content item in the list, wherein the indicator identifies which of the one or more predetermined criteria is met by the respective content item.

18. The system of claim 11, wherein in response to receiving a selection of a content item from the list of the subset of the plurality of content items, the control circuitry is further configured to:

automatically provide the selected content item for consumption.

19. The system of claim 11, wherein the predetermined trending use criteria is based at least in part on social media data.

20. The system of claim 11, wherein the input is a voice input.

* * * * *